(12) United States Patent
Moskovich et al.

(10) Patent No.: US 9,165,023 B2
(45) Date of Patent: Oct. 20, 2015

(54) INTEGRATED CIRCUIT DEVICE AND METHOD FOR DETERMINING AN INDEX OF AN EXTREME VALUE WITHIN AN ARRAY OF VALUES (75) Inventors: Ilia Moskovich, Kiriat-Gat (IL); Aviram Amir, Petach-Tiqwa (IL); Itzhak Barak, Kadima (IL); Eliezer Ben Zeev, Bat Yam (IL)

(73) Assignee: Freescale Semiconductor, Inc., Austin, TX (US)

(*) Notice: Subject to any disclaimer, the term of this patent is extended or adjusted under 35 U.S.C. 154(b) by 317 days.

(21) Appl. No.: 13/978,251

(22) PCT Filed: Jan. 31, 2011

(86) PCT No.: PCT/IB2011/050419
§ 371 (c)(1),
(2), (4) Date: Jul. 3, 2013

(87) PCT Pub. No.: WO2012/104674
PCT Pub. Date: Aug. 9, 2012

(65) Prior Publication Data
US 2013/0297578 A1   Nov. 7, 2013

(51) Int. Cl.
*G06F 9/30* (2006.01)
*G06F 17/30* (2006.01)

(52) U.S. Cl.
CPC ...... *G06F 17/30336* (2013.01); *G06F 9/30021* (2013.01); *G06F 9/30036* (2013.01)

(58) Field of Classification Search
None
See application file for complete search history.

(56) References Cited

U.S. PATENT DOCUMENTS

| 5,051,939 | A | * | 9/1991 | Nakamura | 708/207 |
|---|---|---|---|---|---|
| 5,991,785 | A | * | 11/1999 | Alidina et al. | 708/207 |
| 2002/0118189 | A1 | * | 8/2002 | Abdallah | 345/422 |
| 2006/0101230 | A1 | | 5/2006 | Roth et al. | |
| 2006/0112259 | A1 | | 5/2006 | Ganapathy et al. | |
| 2007/0192655 | A1 | | 8/2007 | Nagaraj | |
| 2008/0201346 | A1 | | 8/2008 | Monro | |
| 2009/0132785 | A1 | | 5/2009 | Selvaggi et al. | |
| 2010/0057676 | A1 | | 3/2010 | Ramaiyer | |

OTHER PUBLICATIONS

International Search Report and Written Opinion correlating to PCT/IB2011/050419 dated Oct. 27, 2011.

* cited by examiner

*Primary Examiner* — Kris Rhu (57) ABSTRACT

An integrated circuit device comprises at least one digital signal processor, DSP, module, the at least one DSP module comprising a plurality of data registers and at least one data execution unit, DEU, module arranged to execute operations on data stored within the data registers. The at least one DEU module is arranged to, in response to receiving an extreme value index instruction, compare a previous extreme value located within a first data register set of the DSP module with at least one input vector data value located within a second data register set of the DSP module, and determine an extreme value thereof. The at least one DEU module is further arranged to, if the determined extreme value comprises an input vector data value located within the second data register set, store the determined extreme value in the first data register set, determine an index value for the determined extreme value, and store the determined index value in the first data register set.

20 Claims, 4 Drawing Sheets

INTEGRATED CIRCUIT DEVICE AND METHOD FOR DETERMINING AN INDEX OF AN EXTREME VALUE WITHIN AN ARRAY OF VALUES

FIELD OF THE INVENTION

The field of this invention relates to an integrated circuit device and method for determining an index of an extreme value within an array of values.

BACKGROUND OF THE INVENTION

Digital Signal Processor (DSP) applications are becoming increasingly more demanding in their requirements of DSP cores. For example, the increased data rates specified for the fourth generation (4G) of mobile telecommunication systems require significantly higher DSP performance. One operation that is often required to be performed is that of finding the index of an element comprising, say, a maximum or minimum value, or modulus (absolute maximum) value, within a given systematic arrangement of values such as an array (as opposed to the maximum/minimum value itself). For clarity, an index comprises an identifier for a specific element within, say, an array, such as in the form of a relative location of the array element within the array. For example, the search for the index of a maximum value within an array is often used within communication systems for such algorithms as timing/frequency offset detection (whereby a received signal is correlated with a pilot sequence, and the index of the maximum correlation typically corresponds to the timing/frequency offset), as well as for finding one of many possible transmitted sequences using cross correlation e.g. a maximum likelihood (ML) decoder.

In order to perform such max/min value index finding operations using traditional DSP implementations, it is typically necessary for the application program code to comprise an 'if' statement that results in a 'change of flow' in the application program code. To improve the overall throughput of DSPs, a pipelined architecture is typically implemented in order to reduce the overall number of cycles per instruction, and thereby improve the throughput of the DSP. However, a change of flow, such as may result from the use of an 'if' statement, effectively voids any benefit provided by such a pipelined architecture for that part of the application program code, significantly reducing the efficiency of the DSP. In addition, the use of an 'if' statement to perform such max/min value index finding operations prevents more than one max/min value index finding operation being performed per cycle (due to the limitation of using a dedicated conditional flag within the DSP), irrespective of the ability of the processing parallelism within DSP architecture.

Since such max/min value index finding operations may be required to be performed on a regular basis within a mobile telecommunication receiver, such a reduction in the efficiency of the DSP for performing such operations can have a significant detrimental effect on the overall performance of the DSP.

SUMMARY OF THE INVENTION

The present invention provides an integrated circuit device and method for determining an index of an extreme value within an array of values, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples of the present invention will now be described with reference to an example of a digital signal processor (DSP) architecture. However, it will be appreciated that the present invention is not limited to the specific DSP architecture herein described with reference to the accompanying drawings, and may equally be applied to alternative DSP architectures. For the illustrated example, a DSP architecture is provided comprising separate data and address registers. Alternatively, the address registers may be combined with the data registers, and the combined registers being used to provide address storage, etc. Furthermore, for the illustrated examples, the DSP architecture is shown as comprising four data execution units. However, it will be appreciated that examples of the present invention may equally be implemented within a DSP architecture comprising any other number of data execution units, e.g. one, two, eight, etc. Additionally, because the illustrated example embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
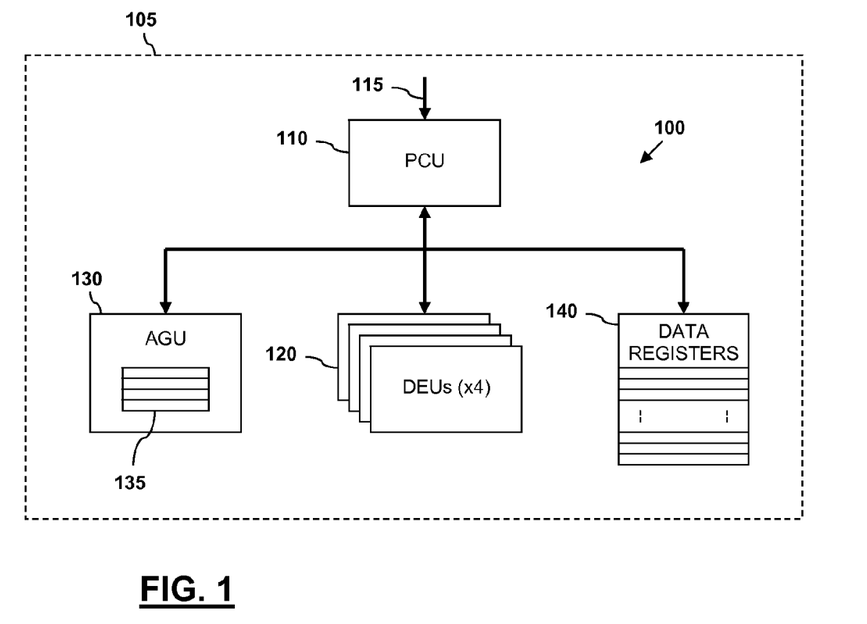
FIG. 1 illustrates a simplified block diagram of an example of part of a DSP module.

Referring first to FIG. 1, there is illustrated a simplified block diagram of an example of a part of a DSP module 100 in accordance with some example embodiments of the present invention. In the illustrated example, the DSP module 100 is a part of an integrated circuit device, illustrated generally at 105, and comprises at least one program control unit (PCU) 110, one or more data execution unit (DEU) modules 120, at least one address generation unit (AGU) 130 and a plurality of data registers, illustrated generally at 140. The PCU 110 is arranged to receive DSP instructions, as illustrated generally at 115, and to cause an execution of operations within the DSP module 100 in accordance with the received DSP instructions. For example, the PCU 110 may receive a DSP instruction, for example stored within an instruction buffer (not shown), where the received DSP instruction requires one or more operations to be performed on one or more bits/bytes/words/etc. of data. A data 'bit' typically refers to a single unit of binary data comprising either a logic '1' or logic '0', whilst a 'byte; typically refers to a block of 8-bits. A data 'word' may comprise one or more bytes of data, for example two bytes (16-bits) of data, depending on the particular DSP architecture. Upon receipt of such a DSP instruction, the PCU 110 generates and outputs instructions and/or control signals to the various other components within the DSP module 100 in order for the required operations to be performed. The AGU 130 is arranged to generate address values for accessing system memory, and may comprise one or more address registers as illustrated generally at 135. The data registers 140 provide storage for fetched from system memory, and on which one or more operations is/are to be performed, and from which data may be written to system memory. The DEU modules 120 are arranged to perform operations on data (either provided directly thereto or stored within the data registers 140) in accordance with instructions and control signals received from the PCU 110. As such, the DEU modules 120 may comprise arithmetic logic units (ALUs), etc.

As previously mentioned, DSP applications may require an index of a data element comprising a maximum or minimum value or modulus (absolute maximum) value (hereinafter generally referred to as an extreme value) within a given systematic arrangement of values such as an array (as opposed to the maximum/minimum value itself). In accordance with some example embodiments of the present invention, at least one of the DEU modules 120 is arranged to, upon receipt of an extreme (e.g. maximum or minimum) value index instruction, compare a previous extreme value located within a first data register set of the DSP module 100 to at least one input vector data value located within a second data register set of the DSP module 100, and determine an extreme value thereof. The at least one DEU module 120 is further arranged to, if the determined extreme value comprises an input vector data value located within the second data register set, store the determined extreme value in the first data register set. The at least one DEU module 120 also determines an index value for the determined extreme value, and stores the determined index value in the first data register set.

Figure 2:
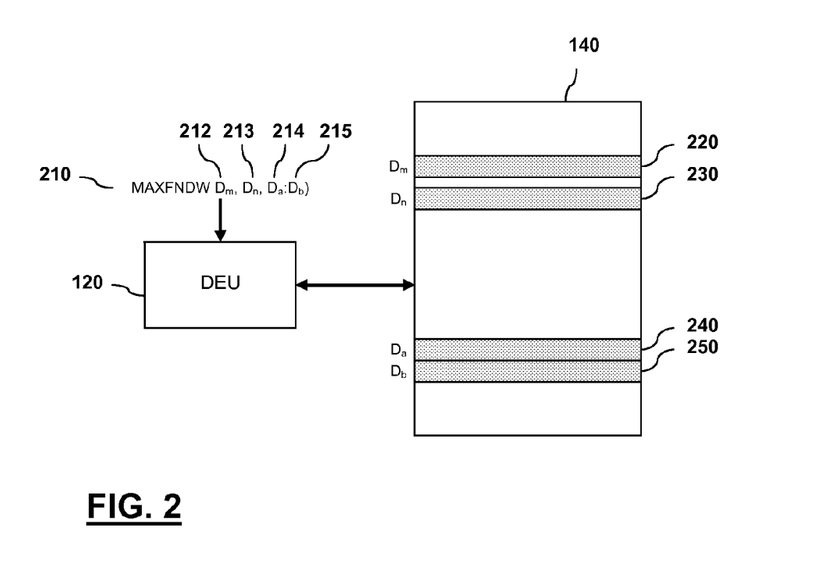
FIG. 2 illustrates a simplified example of a data execution unit (DEU) module executing an extreme value index instruction.

FIG. 2 illustrates a simplified example of a DEU module 120 executing such an extreme value index instruction. For the example illustrated in FIG. 2, the DEU module 120 receives a maximum value index instruction 210, for example from the PCU module 110 of FIG. 1. The maximum value index instruction 210 comprises, in one example, one or more data register identifiers for one or more data registers that make up a first data register set. For the illustrated example, the first register set comprises a first data register identifier 212 for a first data register 220, and a second data register identifier 213 for a second data register 230. The maximum value index instruction 210 further comprises one or more data register identifiers for one or more further data registers that make up a second data register set, which for the illustrated example comprises a third data register identifier 214 for a third data register 240, and a fourth data register identifier 215 for a fourth data register 250. Upon receipt of the maximum value index instruction 210, the DEU module 120 compares a previous extreme value located within the first data register set (i.e. within one of the first or second data registers 220, 230 for the illustrated example) to one or more input vector values located within the second data register set (i.e. within the third and fourth data registers 240, 250 for the illustrated example), and determines a maximum value therefor. If the determined maximum value comprises an input vector data value located within the second data register set (i.e. within one of the third and fourth data registers 240, 250 for the illustrated example), the DEU module 120 stores the determined maximum value in the first data register set (i.e. within one of the first or second data registers 240, 250 for the illustrated example). Furthermore, the DEU module 120, in this example, determines an index value for the determined maximum value, and also stores the determined index value in the first data register set (i.e. within one of the first or second data registers 240, 250 for the illustrated example).

In this manner, a current maximum value from previously performed input vector value comparisons, and an index value therefor, are both stored in a set of data registers separate from the input vector values from which the index of the maximum value is being sought. In this manner, for each execution cycle of the DSP module 100, a new input vector (containing values from an array, or other systematic arrangement, of values for which the index of a maximum value is required) may be loaded into the second set of data registers (e.g. data registers 240, 250), whilst data within the first set of data registers (e.g. data registers 220, 230) is maintained between execution cycles. Thus, in this manner, input vectors comprising data values from the array of values may be sequentially loaded into the second set of data registers in, for example, substantially consecutive execution cycles of the DSP module 100, with the DEU module 120 updating the current maximum value and index value therefor within the first set of data registers.

Figure 3:
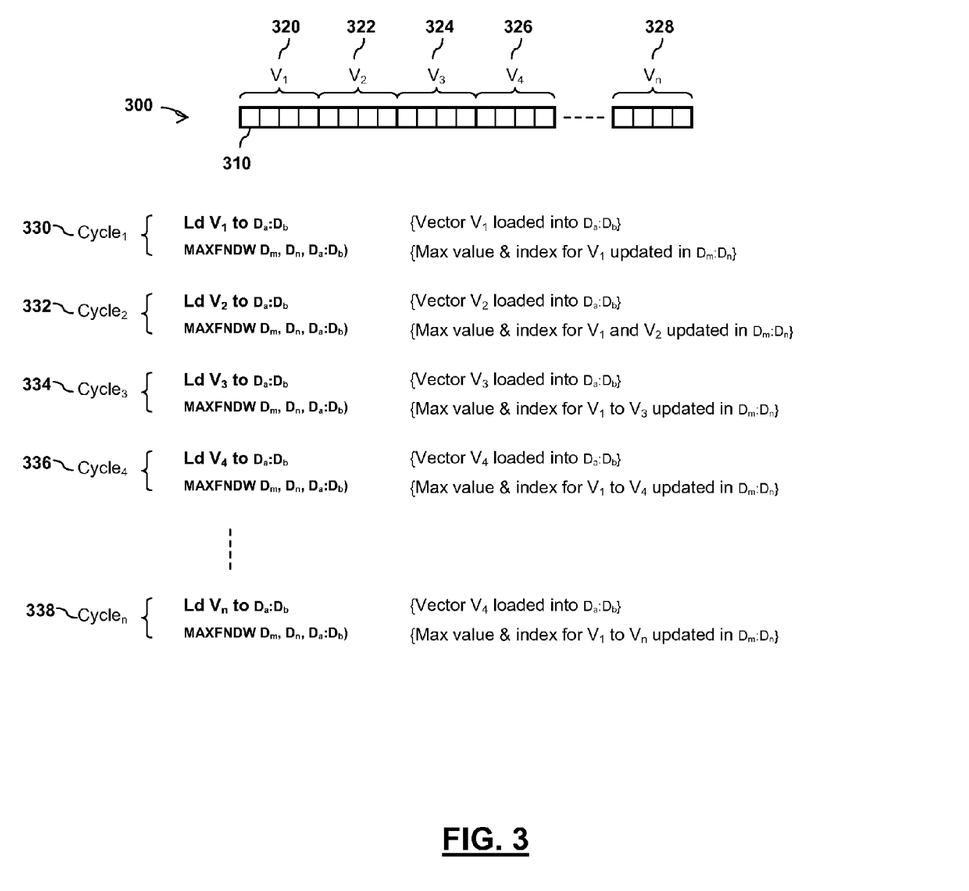
FIG. 3 illustrates a simplified example of a one dimensional array of values.

For example, FIG. 3 illustrates an array 300 of values. For ease of understanding, array 300 is a one dimensional array comprising a plurality of array elements 310; each array element 310 containing a data value. The array 300 may be partitioned in to n vectors, as illustrated at 320, 322, 324, 326, 328. As described above, each vector 320, 322, 324, 326, 328 may be sequentially loaded into the second set of data registers (e.g. data registers 240, 250 in FIG. 2) in order to determine the index of the maximum value within the array 300. More specifically, and as illustrated in FIG. 3, within each execution cycle 330, 332, 334, 336, 338 of the DEU 120, a vector 320, 322, 324, 326, 328 comprising data values from the array 300 may be sequentially loaded into the second set of data registers 240, 250, and the maximum value index instruction 210 executed to aggregately determine the maximum value within the loaded vectors 320, 322, 324, 326, 328 and index value therefor. Accordingly, the DEU module 120 is capable of processing (i.e. determining the max/min value and an index value therefore) i values from an array of values each execution cycle, where i equals the number of values that may be stored within the second set of data registers (and thus the number of values within each vector 320, 322, 324, 326, 328). Furthermore, since the current maximum value and index value therefor may be maintained and updated substantially indefinitely within the first data register set, whilst input vectors 320, 322, 324, 326, 328 comprising data values are sequentially loaded into the second set of data registers in consecutive execution cycles, an index value for a maximum value within substantially any size of array may be determined without any additional processing overhead beyond that of executing consecutive maximum value index instructions 210. That is to say, for an array of j values, the number of execution cycles n required for a single DEU module 120 to find the index of the maximum value will be j/i. The above example may apply equally to the execution of a minimum value index instruction. Thus, in this manner, the example of an extreme value index instruction described above provides an efficient mechanism for finding the index of a maximum or minimum value within an array.

Furthermore, in some examples, the ability of the DEU modules 120 within the DSP module 100 to execute such an extreme value index instruction may substantially alleviate a need for an equivalent operation to be implemented using conventional application program code instructions, and thereby alleviate the necessity of using 'if' statements that result in changes of program flow. As such, the use of such an extreme value index instruction may enable some of the benefits of a pipelined architecture to be fully exploited, along with any parallel processing ability provided within DSP architecture. For example, extreme value index instructions may be provided to a plurality of DEU modules 120. In this manner, one or more DEU modules 120 may perform the operations of finding indexes for maximum and/or minimum values within multiple arrays in parallel. Alternatively, the operation of finding an index for a maximum/minimum value within a single array may be divided between multiple DEU modules 120.

Figure 4:
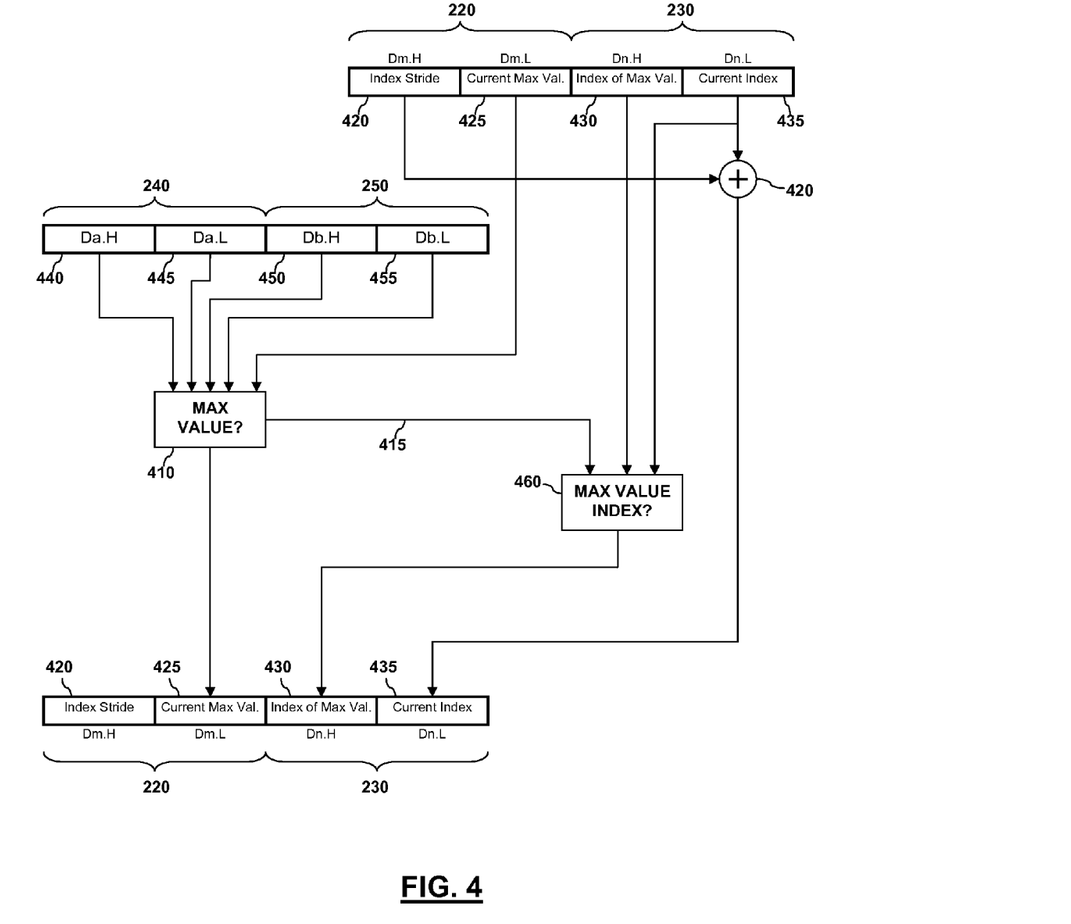
FIG. 4 illustrates a simplified example of an execution of a maximum value index instruction.

Referring now to FIG. 4, there is illustrated a simplified example of a maximum value index instruction being executed according to some example embodiments of the present invention, for example as may be implement by one or more of the DEU modules 120. As for the example illustrated in FIG. 2, a first set of data registers comprises a first data register 220 and a second data register 230. Each data register may comprise, for example, a 32-bit data register divided into two separately accessible 16-bit sections. Thus, for the illustrated example a current maximum value 425, for example from previous executions of the maximum value index instruction, is stored within a first section of the first data register 220. An index value 430 for this current maximum value 425 is stored within, for the illustrated example, a first section of the second data register 230. A second set of data registers comprises a third data register 240 and a fourth data register 250. A new input vector (containing values 440, 445, 450, 455 from an array, or other systematic arrangement, of values for which the index of, in the illustrated example, a maximum value is required) may be loaded into the second set of data registers (i.e. data registers 240, 250 for the illustrated example) in each execution cycle. A comparison of the current maximum value 425 located within the first data register set 220, 230 and the input vector data values 440, 445, 450, 455 located within a second data register set 240, 250 is made, for example by using a first combination logic unit illustrated generally at 410, and where a maximum value is determined thereby.

If the determined maximum value comprises one of the input vector data values 440, 445, 450, 455 located within the second data register set 240, 250, the determined maximum value may be stored within the first set of data registers 220, 230. Specifically for the illustrated example, if the determined maximum value comprises one of the input vector data values 440, 445, 450, 455 located within the second data register set 240, 250, the previous maximum value 425 located within the first section of the first data register 220 may be overwritten with the (new) determined maximum value. Furthermore, an index value for the new maximum value may be determined, and also stored within the first set of data registers 220, 230. Specifically for the illustrated example, if the determined maximum value comprises one of the input vector data values 440, 445, 450, 455 located within the second data register set 240, 250, the index 430 of the previous maximum value 425 located within the first section of the second data register 230 may be overwritten with the index value for the new maximum value.

In some examples, an index value for the new maximum value may be based on both a current index value for the current input vector stored within the second set of data registers 240, 250 and an index value for a location of the new maximum value within the second data register set 240, 250. For example, and as illustrated in FIG. 4, a current index value 435 for the current input vector within the second set of data registers 240, 250 may be located within the first set of data registers, and specifically for the illustrated example within a second section of the second data register 230. Such an current index value 435 for the current input vector may be provided to second combination logic unit, such as illustrated generally at 460. Furthermore, the first combination logic unit 410 arranged to determine the maximum value may be arranged to provide an index value 415, or other identifier, for the location of the determined maximum value. In this manner, if the determined maximum value comprises one of the input vector data values 440, 445, 450, 455 located within the second data register set 240, 250, the second combination logic unit 460 may add, or otherwise combine, the index value 435 for the current input vector and the index value 415 for the location of the determined maximum value within the input vector in order to generate an index value 430 for the new maximum value 425. This index value 430 is then stored within the first data register set 220, 230.

In order for the current index value 435 to be accurate, in some examples, it may be necessary for the current index value 435 to be updated each time a new input vector is loaded into the second data register set 240, 250. Accordingly, in some examples, during execution of each maximum value index instruction, the current index value may be, say, incremented by a defined amount. For the illustrated example, an index stride value 420 is located within the first data register set 220, 230, and in particular for the illustrated example is stored within a second section of the first data register 220. The current index value 435 for the current input vector is incremented during each execution of a maximum value index instruction by an amount equal to the index stride value 420, as illustrated generally at 470. The incremented current index value may then be stored back in the first data register set 220, 230, overwriting the previous current index value 435. In this manner, the current index value 435 is incremented to a new value ready for the execution of the maximum value index instruction with the next input vector.

Referring back to the comparison of the current maximum value 425 located within the first data register set 220, 230 and the input vector data values 440, 445, 450, 455 located within the second data register set 240, 250, by first combination logic unit 410, if the determined maximum value comprises the current maximum value 425 located within the first data register set 220, 230, then the current maximum value 425 is to be maintained. For example, no value need be stored in the first data register set 220, 230 since the correct value is already present. However, to simplify the implementation in one example, the first combination logic unit 410 may be arranged to store whatever maximum value is determined. As such, if the determined maximum value comprises the current maximum value 425 located within the first data register set 220, 230, then the current maximum value 425 may be re-written over itself in the first data register set 220, 230. Similarly, if the determined maximum value comprises the current maximum value 425 located within the first data register set 220, 230, then the second combination logic unit 460 for determining an index value for the maximum value may be arranged to either store no new value within the first data register set 220, 230, or to re-write the index value 430 of the current maximum value 425 over itself.

FIG. 3 illustrates an example of the execution of a maximum value index instruction. The execution may also be performed for a minimum value index instruction, with the exception of an equivalent for the first combination logic unit 410 being arranged to perform a comparison of a current value 425 located within the first data register set 220, 230 and the input vector data values 440, 445, 450, 455 located within the second data register set 240, 250, in order to determine a minimum value.

Figure 5:
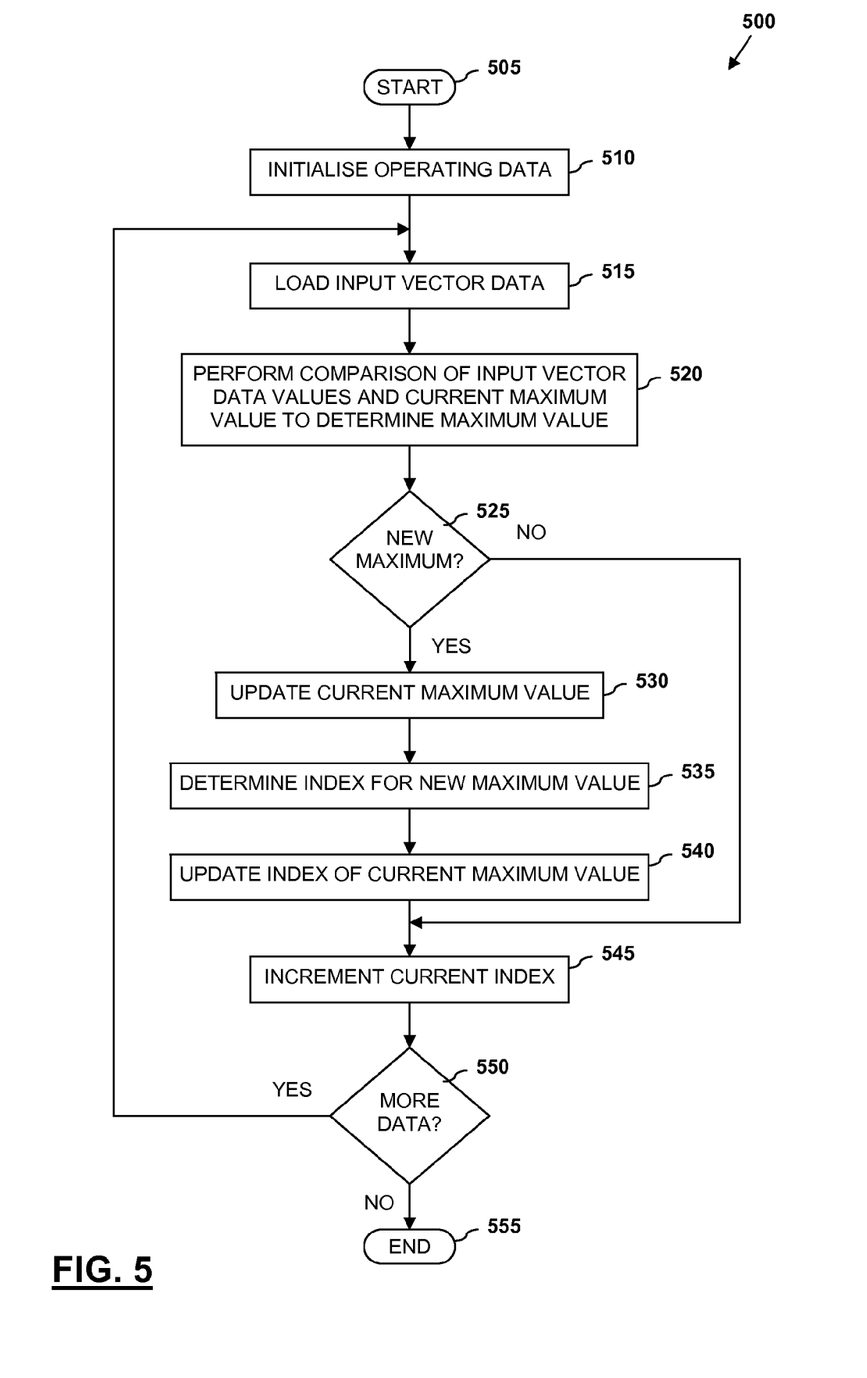
FIG. 5 illustrates a simplified flowchart of an example of a method for determining an index for an extreme value within an array of values.

Referring now to FIG. 5, there is illustrated a simplified flowchart 500 of an example of a method for determining an index for an extreme value within an array of values according to some example embodiments of the present invention, for example as may be implemented within the DSP module 100 of FIG. 1. The method starts at 505, and moves on to 510 where operating data is initialised within a first set of data registers, for example in response to an initialisation instruction. For example, for the embodiment illustrated in FIG. 4, such operating data may comprise the index stride value 420, a current maximum value 425, an index value for the current maximum value 430, and a current index value for input vector 435. The initialisation of such operating data may comprise setting each value to a default or definable initial value. At 515, input vector data is loaded into a second set of data registers (which in some examples contains values from an array of values for which the index of a maximum value is required). A comparison of the input vector data values (stored within the second set of data registers) and the current maximum value (stored within the first set of data registers) is then performed at 520, in order to determine a maximum value there between. For the illustrated example, if the determined maximum value is one of the input vector data values located within the second data register set (i.e. a new maximum value), at 525, the method moves on to 530, where the previous current maximum value stored within the first data register set is replaced with the new maximum value. An index for the new maximum value is then determined at 535, and an index value for the previous current maximum value within the first data register set is replaced with the index value for the new current maximum value at 540. A current index value for the input vector within the second data register set is then incremented, for example by an amount equal to an index stride (such as index stride 420) located within the first data register set, at 545. If more data values remain within the array of values for which the index of a maximum value is required, at 550, the method loops back to 515, and the next input vector of values from the array is loaded into the second data register set. However, if no further data values remain, the method ends at 555. Referring back to 525, for the illustrated example, if the determined maximum value comprises the current maximum value 425 located within the first data register set, the method jumps to 545, thereby maintaining the current maximum value and the index value therefor within the first data register set. However, in some examples, if the determined maximum value is equal to the current maximum value 425 located within the first data register set, the method may alternatively comprise re-writing the current maximum value and/or the index therefor into the first data register set. The current index for the input vector within the second data register is incremented 545, and the method either loops back to 515 at 550, in order to load the next input vector, or ends at 555.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for clarity the PCU module 110, AGU 130, DEU modules 120 and data registers 140 have been illustrated as comprising substantially discrete logical elements within the DSP module 100. However it will be appreciated that such functional elements may be provided within any suitable distribution of physical modules.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising:
    at least one digital signal processor (DSP) module, the at least one DSP module comprising a plurality of data registers and at least one data execution unit (DEU) module arranged to execute operations on data stored within the data registers;
    wherein the at least one DEU module is arranged to, in response to receiving an extreme value index instruction, compare a previous extreme value located within a first data register set of the DSP module with at least one input vector data value located within a second data register set of the DSP module, and determine an extreme value thereof;
    wherein the at least one DEU module is further arranged to, if the determined extreme value comprises an input vector data value located within the second data register set, store the determined extreme value in the first data register set, determine an index value for the determined extreme value, and store the determined index value in the first data register set.

2. The integrated circuit device of claim 1 wherein the at least one DEU module is arranged to overwrite the previous extreme value located within the first data register set with the determined extreme value, if the determined extreme value comprises the input vector data value located within the second data register set.

3. The integrated circuit device of claim 1 wherein the at least one DEU module is arranged to overwrite an index value for the previous extreme value located within the first data register set with the determined index value for the determined extreme value, if the determined extreme value comprises the input vector data value located within the second data register set.

4. The integrated circuit device of claim 1 wherein the at least one DEU module is arranged to determine an index value for the determined extreme value based on a current index value located within the first data register set and an index value for a location of the determined extreme value within the second data register set, if the determined extreme value comprises the input vector data value located within the second data register set.

5. The integrated circuit device of claim 4 wherein the at least one DEU module is further arranged to increment the current index value located within the first data register set during execution of the received extreme value index instruction.

6. The integrated circuit device of claim 5 wherein the at least one DEU module is arranged to increment the current index value by an amount equal to an index stride value located within the first data register set during execution of the received extreme value index instruction.

7. The integrated circuit device of claim 1 wherein the first data register set comprises at least one data register arranged to store therein at least one from a group consisting of:
    an index stride value;
    a previous extreme value;
    an index value for the previous extreme value; and
    a current index value.

8. The integrated circuit device of claim 1 wherein the extreme value index instruction comprises a maximum value index instruction or a minimum value index instruction.

9. A method for determining an index for an extreme value within an array of values; the method comprising:
    comparing a previous extreme value located within a first data register set and at least one input vector data value located within a second data register set and determining an extreme value thereof; and
    in response to determining that the extreme value thereof comprises an input vector data value located within the second data register set:
        storing the determined extreme value in the first data register set;
        determining an index value for the determined extreme value; and
        storing the determined index value in the first data register set.

10. The integrated circuit device of claim 2 wherein the at least one DEU module is arranged to overwrite an index value for the previous extreme value located within the first data register set with the determined index value for the determined extreme value, if the determined extreme value comprises the input vector data value located within the second data register set.

11. The integrated circuit device of claim 2 wherein the at least one DEU module is arranged to determine an index value for the determined extreme value based on a current index value located within the first data register set and an index value for a location of the determined extreme value within the second data register set, if the determined extreme value comprises the input vector data value located within the second data register set.

12. The integrated circuit device of claim 3 wherein the at least one DEU module is arranged to determine an index value for the determined extreme value based on a current index value located within the first data register set and an index value for a location of the determined extreme value within the second data register set, if the determined extreme value comprises the input vector data value located within the second data register set.

13. The integrated circuit device of claim 2 wherein the first data register set comprises at least one data register arranged to store therein at least one from a group consisting of:
   an index stride value;
   a previous extreme value;
   an index value for the previous extreme value; and
   a current index value.

14. The integrated circuit device of claim 3 wherein the first data register set comprises at least one data register arranged to store therein at least one from a group consisting of:
   an index stride value;
   a previous extreme value;
   an index value for the previous extreme value; and
   a current index value.

15. The integrated circuit device of claim 4 wherein the first data register set comprises at least one data register arranged to store therein at least one from a group consisting of:
   an index stride value;
   a previous extreme value;
   an index value for the previous extreme value; and
   a current index value.

16. The integrated circuit device of claim 5 wherein the first data register set comprises at least one data register arranged to store therein at least one from a group consisting of:
   an index stride value;
   a previous extreme value;
   an index value for the previous extreme value; and
   the current index value.

17. The integrated circuit device of claim 6 wherein the first data register set comprises at least one data register arranged to store therein at least one from a group consisting of:
   an index stride value;
   a previous extreme value;
   an index value for the previous extreme value; and
   the current index value.

18. The integrated circuit device of claim 2 wherein the extreme value index instruction comprises a maximum value index instruction or a minimum value index instruction.

19. The integrated circuit device of claim 3 wherein the extreme value index instruction comprises a maximum value index instruction or a minimum value index instruction.

20. The integrated circuit device of claim 4 wherein the extreme value index instruction comprises a maximum value index instruction or a minimum value index instruction.

* * * * *